(12) United States Patent
Fournier et al.

(10) Patent No.: US 7,444,160 B1
(45) Date of Patent: Oct. 28, 2008

(54) SILENT MODE FOR MOBILE TERMINAL PUSH-TO-TALK

(75) Inventors: Gwendolyn Fournier, Durham, NC (US); William Gray, Raleigh, NC (US)

(73) Assignee: Sony Ericsson Mobile Communications AB, Lund (SE)

( * ) Notice: Subject to any disclaimer, the term of this patent is extended or adjusted under 35 U.S.C. 154(b) by 328 days.

(21) Appl. No.: 10/710,547

(22) Filed: Jul. 20, 2004

(51) Int. Cl.
*H04Q 7/20* (2006.01)

(52) U.S. Cl. .............................. 455/518; 455/519

(58) Field of Classification Search .......... 455/516–521
See application file for complete search history.

(56) References Cited

U.S. PATENT DOCUMENTS

| | | | |
|---|---|---|---|
| 7,085,365 B2 * | 8/2006 | Kauppinen | 379/202.01 |
| 7,280,502 B2 * | 10/2007 | Allen et al. | 370/329 |
| 2005/0135374 A1 * | 6/2005 | Isomaki et al. | 370/395.2 |
| 2005/0192039 A1 * | 9/2005 | Xue et al. | 455/517 |

OTHER PUBLICATIONS

Comneon, Ericsson, Motorola, Nokia and Siemens, "List Management and Do-not-Disturb V2.0.6 (Jun. 2004)" Technical Specification, Push to Talk over Cellular (PoC); List Management and Do-not-Disturb; PoC Release 2.0.

\* cited by examiner

*Primary Examiner*—Edward Urban
*Assistant Examiner*—Raymond S Dean
(74) *Attorney, Agent, or Firm*—Frederick D. Bailey; Moore & Van Allen, PLLC

(57) ABSTRACT

A method for invoking a silent mode for a Push-to-talk technology ("PTT") mobile terminals. When a mobile terminal user selects the silent mode option, the mobile terminal sends a message to a PTT server that maintains a PTT user accept list. This message instructs the PTT server to disable a global setting that controls the PTT accept list. Once disabled, all incoming PTT calls are in manual answer mode and require user interaction to be accepted. The calling party is notified that the called party is not in auto-answer mode and that the PTT invitation must be accepted before a PTT call session can occur. When exiting silent mode, the user again selects the silent mode option. This causes the mobile terminal to send a message to the PTT server instructing the PTT server to enable the global setting that controls the accept list, thereby enabling auto-answer mode.

8 Claims, 2 Drawing Sheets

SILENT MODE FOR MOBILE TERMINAL PUSH-TO-TALK

BACKGROUND OF INVENTION

Mobile terminal users increasingly rely on their mobile terminals for their communication and organizational needs. More recently, Push-to-Talk (PTT) technology over a cellular network, a Voice-Over IP (VoIP) network such as Session Initiated Protocol (SIP), or a Wireless Local Area Network (WLAN) has provided even more options for personal communications among groups of users. PTT provides users with instantaneous connections that bypass some of the more rigorous call establishment procedures associated with traditional mobile terminal calls. It is the convenience of instantaneous two-way connection that gives PTT its appeal.

Most PTT solutions allow users to receive PTT calls with the audio sent directly to speaker phone without user interaction. This type of PTT call is commonly labeled barge, auto answer, or auto accept. While convenient in most instances, it can be undesirable and/or disruptive in other instances such as meetings. The user will typically mute the sounds of the mobile terminal such that incoming events do not make an audible noise. This is referred to most commonly as "silent mode".

In PTT over cellular (PoC) standards, call type settings such as auto or manual are maintained by a global contact list and another list termed the accept list. There may be significant overlap between the contact and accept list. The global contact list represents other PTT users that the user has identified for PTT communications by entering them into their contact list. The default answering mode is manual meaning that a PTT call invitation is issued by the calling party and appears on the called party's mobile terminal. The called party can then opt to accept or decline the invitation. The user can also create an accept list that may be a subset of the contact list as well as other PTT identifiers. On the accept list, the user maintains other PTT users and/or groups from whom the user will receive instant talk session requests. In addition to the accept list, there is another auto-answer mode flag. If the user sets his auto-answer mode flag on, sessions from the accept list utilize auto-answer mode. If the auto-answer mode is off, then manual answer mode is applied. There is also a reject list to allow a user to maintain a list of users from whom he does not wish to receive PTT calls. These are convenience features for many PTT users that wish to screen and de-screen certain PTT calls.

The contact and accept lists, however, are maintained not on the mobile terminal, but rather by the mobile infrastructure on a specific computer PTT server assigned the task. In order to receive PTT calls as auto answer, it is necessary for the user to add desired callers to their accept list. It is also required that a global setting be enabled. The global setting controls the function of the accept list. If the global setting is disabled, contacts on the accept list remain in "manual" answer mode which requires user interaction to answer a PTT call invitation.

There is currently no solution that allows a user to enter silent mode without having to remove contacts from the PTT server maintained accept list.

What is needed is a procedure that invokes silent mode for PTT on a mobile phone without causing reconfiguration of user-defined access lists that are maintained on the server.

SUMMARY OF INVENTION

A method for invoking silent mode for a mobile terminal in which silent mode also includes PTT calls. A mobile terminal user selects the silent mode option causing the mobile terminal to send a Answer_Mode_Manual message to a PTT server charged with maintaining user PTT contact lists. The Answer_Mode_Manual message instructs the PTT server to disable the PoC global setting that controls the accept list. The PTT server will then disable the global setting. Once disabled, all PTT calls are in manual mode and require user interaction. More importantly, the calling party is notified that the called party is not in auto-answer mode and that the PTT invitation must be accepted before a PTT call session can occur. This eliminates possible confusion for the calling party. When the user wishes to exit silent mode, he again selects the silent mode option. This causes the mobile terminal to send an Answer_Mode_Auto message to the PTT server instructing the PTT server to enable the global setting that controls the accept list. The PTT server will then enable the global setting permitting the auto-answer function to work for callers on the accept list.

DETAILED DESCRIPTION

Figure 1:
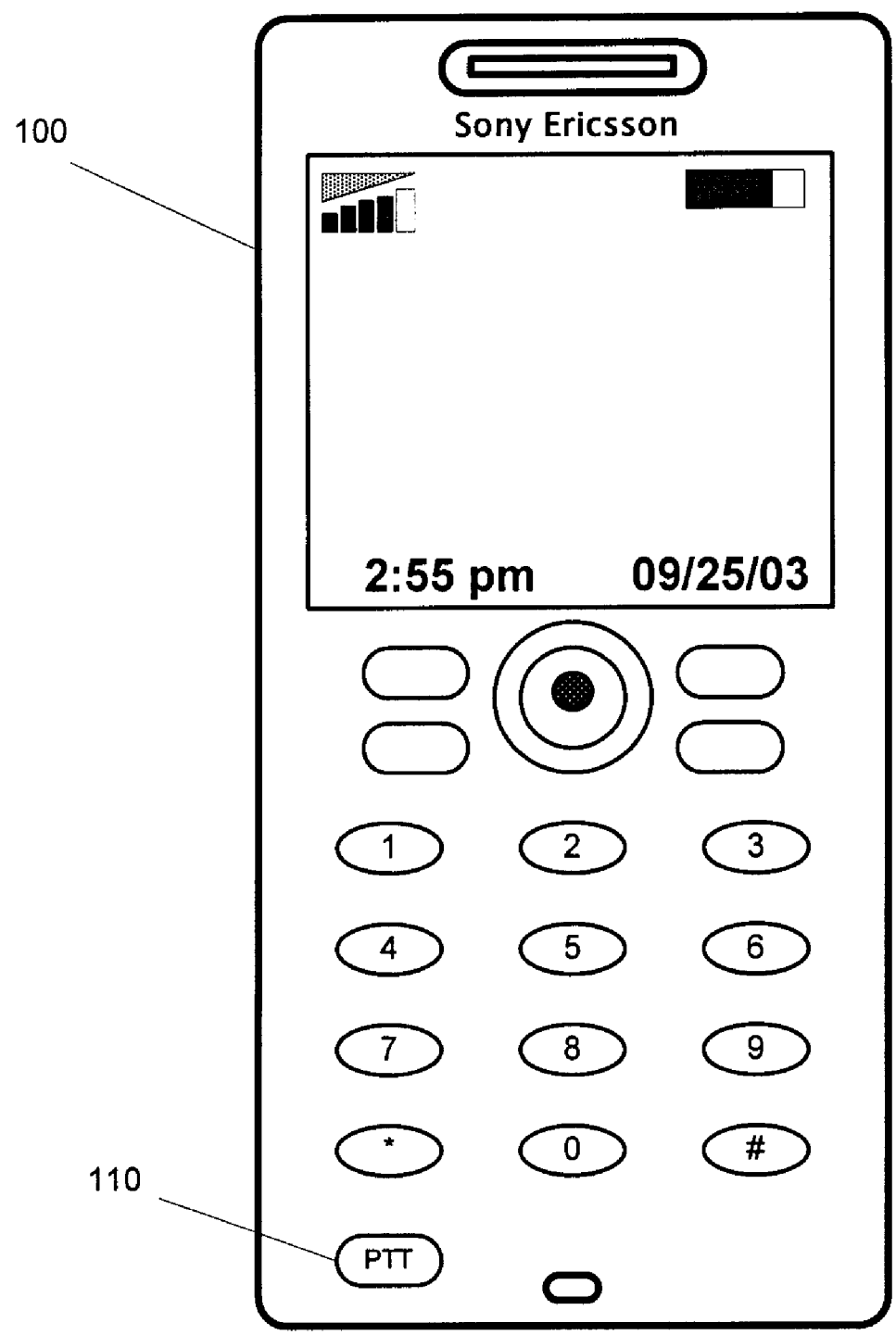
FIG. 1 illustrates a typical mobile terminal having a PTT function.

FIG. 1 illustrates a typical mobile terminal 100. Mobile terminal 100 is shown having a display along with a keypad for entering data into the mobile terminal. One of the keys shown is a PTT key 110. The PTT key, when depressed, places mobile terminal 100 in a Push-to-Talk mode as opposed to the regular full duplex call establishment mode for cellular PoC communications. PTT key 110 has been illustrated here as a hard-wired key in the lower left corner of the front face of the mobile terminal. This is illustrative only. One of ordinary skill in the art could easily choose to implement the PTT key in an alternate location or as a "soft key".

As stated earlier, contact and accept lists are maintained on a specific computer PTT server assigned the task, not the mobile terminal. In order to receive PTT calls as auto answer, it is required that the global setting in the PoC standard pertaining to the accept list be enabled. If the global setting is disabled, contacts on the accept list remain in "manual" answer mode which requires user interaction to answer a PTT call invitation. Thus, providing the user with a mechanism by which to toggle the global setting on the PTT server effectively creates a silent mode that does not involve list manipulation such as removal and re-instatement of individuals on the PTT server maintained accept list.

Figure 2:
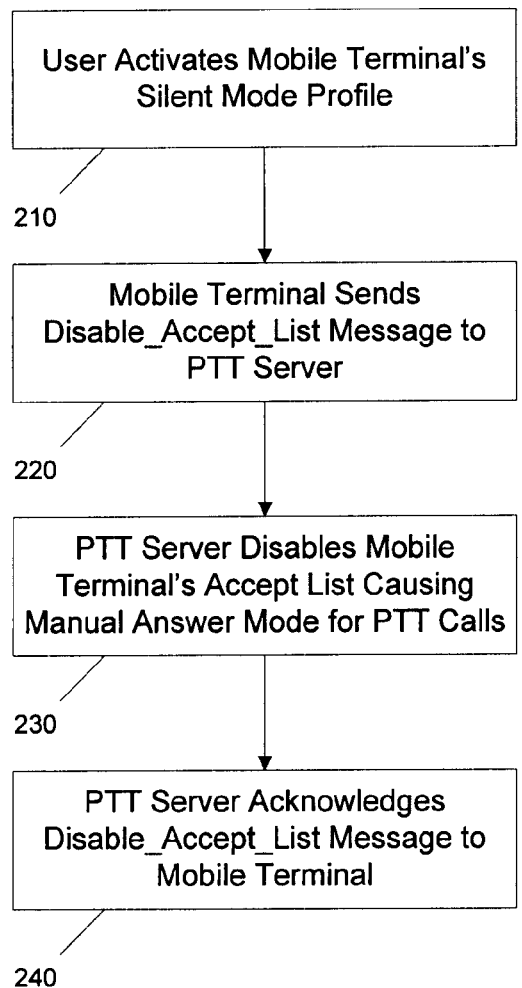
FIG. 2 illustrates a flowchart describing the steps performed by the present invention to activate a silent mode for PTT calls.

FIG. 2 is a flowchart illustrating the steps performed by the present invention to place the mobile terminal in silent mode that does not involve manipulating the PTT server maintained accept list. If the mobile terminal user wishes to invoke silent mode he can navigate his mobile terminal's menu structure until he encounters a silent mode selection or some other descriptive variant. Selecting this option 210 will, in addition to setting the mobile terminal to silent mode for standard cellular calls, cause the mobile terminal to send a Answer_Mode_Manual message 220 to the PTT server instructing the PTT server to disable the global setting that controls the accept list. The PTT server will then disable the global setting 230 and send a Answer_Mode_Manual_Ack message 240 back to the mobile terminal. Once disabled, all PTT calls are in manual mode and require user interaction. More importantly, the calling party is notified that the called party is not in auto-answer mode and that the PTT invitation must be accepted before a PTT call session can occur. This eliminates possible confusion for the calling party.

Figure 3:
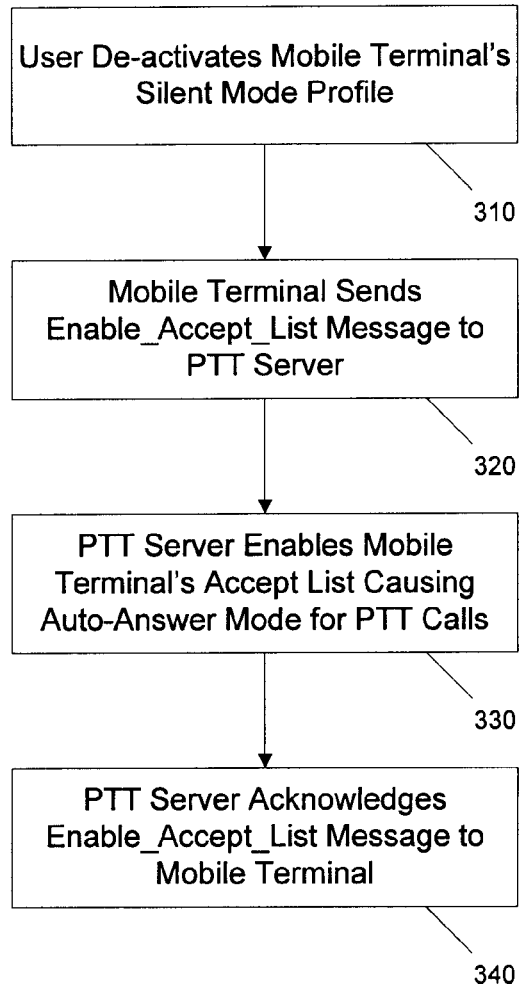
FIG. 3 illustrates a flowchart describing the steps performed by the present invention to de-activate a silent mode for PTT calls.

Referring to FIG. 3, when the user wishes to exit silent mode, he again navigates to the silent mode option and toggles it back to the off setting 310. In addition to deactivating silent mode for standard cellular calls, this causes the mobile terminal to send an Answer_Mode_Auto message 320 to the PTT server instructing the PTT server to enable the global setting that controls the accept list. The PTT server will then enable the global setting 330 and send an Answer_Mode_Auto_Ack message 340 back to the mobile terminal. Now the auto-answer function will work for callers on the accept list.

The silent mode activation mechanism can be a soft key as described by the menu navigation procedure above, or it can be implemented as a hard key somewhere on the exterior surface of the mobile terminal. In addition, the user can create a "shortcut" that allows for faster (less keystrokes) access to silent mode. Shortcuts are common procedures that allow a user to access several frequently used mobile terminal functions or features on an expedited basis.

Computer program elements of the invention may be embodied in hardware and/or in software (including firmware, resident software, micro-code, etc.). Embodiments of the invention may take the form of a computer program product, which can be embodied by a tangible computer-usable or computer-readable storage medium having computer-usable or computer-readable program instructions, "code" or a "computer program" embodied in the storage medium for use by or in connection with the instruction execution system. In the context of this document, a computer-usable or computer-readable storage medium may be any storage medium that can contain, store, communicate, propagate, or transport the program for use by or in connection with the instruction execution system, apparatus, or device. The computer-usable or computer-readable storage medium may be, for example, but not limited to, an electronic, magnetic, optical, electromagnetic, infrared, or semiconductor system, apparatus, device, or propagation medium such as the Internet. Note that the computer-usable or computer-readable storage medium could even be paper or another suitable medium upon which the program is printed, as the program can be electronically captured, via, for instance, optical scanning of the paper or other storage medium, then compiled, interpreted, or otherwise processed in a suitable manner. The computer program product and any software and hardware described herein form the various means for carrying out the functions of the invention in the example embodiments.

Specific embodiments of an invention are disclosed herein. One of ordinary skill in the art will readily recognize that the invention may have other applications in other environments. In fact, many embodiments and implementations are possible. The following claims are in no way intended to limit the scope of the present invention to the specific embodiments described above. In addition, any recitation of "means for" is intended to evoke a means-plus-function reading of an element and a claim, whereas, any elements that do not specifically use the recitation "means for", are not intended to be read as means-plus-function elements, even if the claim otherwise includes the word "means".

The invention claimed is:

1. In a mobile terminal, a method of activating a silent mode for Push-to-Talk (PTT) calls, the method comprising:
    activating a silent mode for the mobile terminal that includes sending a message instructing a PTT server to disable the PTT over cellular (PoC) global setting associated with the mobile terminal's PTT server accept list, wherein in response to the PoC global setting being disabled, calls will be received at the mobile terminal in manual mode requiring an action at the mobile terminal for a PTT call session to occur,
    wherein a calling party is notified that the mobile terminal is not in auto-answer mode and must accept before the PTT call session can occur.

2. In a mobile terminal, a method of de-activating a silent mode for PTT calls, the method comprising:
    de-activating a silent mode for the mobile terminal that includes sending a message instructing a PTT server to enable the PoC global setting associated with the mobile terminal's PTT server accept list, wherein in response to the PoC global setting being enabled, calls will be received at the mobile terminal in an auto-answer mode for callers on the mobile terminal's PTT server accept list,
    wherein in the silent mode, calls are received at the mobile terminal in manual mode requiring an action at the mobile terminal for a PTT call session to occur and a calling party is notified that the mobile terminal is not in auto-answer mode and must accept before the PTT call session can occur.

3. In a PTT server, a method of activating a silent mode for PTT calls for a client mobile terminal, the method comprising:
    receiving a message from the client mobile terminal instructing the PTT server to disable the PoC global setting associated with the client mobile terminal's PTT server accept list, said message the result of the mobile terminal activating a silent mode, wherein in response to the PoC global setting being disabled, calls will be received at the client mobile terminal in a manual mode requiring an action at the mobile terminal for a PTT call session to occur,
    wherein a calling party is notified that the mobile terminal is not in auto-answer mode and must accept before the PTT call session can occur.

4. In a PTT server, a method of de-activating a silent mode for PTT calls for a client mobile terminal, the method comprising:
    receiving a message from the client mobile terminal instructing the PTT server to enable the PoC global setting associated with the client mobile terminal's PTT server accept list, said message the result of the mobile terminal de-activating a silent mode, wherein in response to the PoC global setting being enabled, calls will be received at the mobile terminal in an auto-answer mode for callers on the mobile terminal's PTT server accept list,
    wherein in the silent mode, calls are received at the mobile terminal in manual mode requiring an action at the mobile terminal for a PTT call session to occur and a calling party is notified that the mobile terminal is not in auto-answer mode and must accept before the PTT call session can occur.

5. In a mobile terminal, a computer readable medium storing a computer program product for activating a silent mode for PTT calls, the computer readable medium comprising:

computer program code for activating a silent mode for the mobile terminal that includes computer program code for sending a message instructing a PTT server to disable the PoC global setting associated with the mobile terminal's PTT server accept list, wherein in response to the PoC global setting being disabled, calls will be received at the mobile terminal in a manual mode requiring an action at the mobile terminal for a PTT call session to occur, and wherein a calling party is notified that the mobile terminal is not in auto-answer mode and must accept before the PTT call session can occur.

6. In a mobile terminal, a computer readable medium storing a computer program product for de-activating a silent mode for PTT calls, the computer readable medium comprising:

computer program code for de-activating a silent mode for the mobile terminal that includes computer program code for sending a message instructing a PTT server to enable the PoC global setting associated with the mobile terminal's PTT server accept list, wherein in response to the PoC global setting being enabled, calls will be received at the mobile terminal in an auto-answer mode for callers on the mobile terminal's PTT server accept list, wherein in the silent mode, calls are received at the mobile terminal in manual mode requiring an action at the mobile terminal for a PTT call session to occur and a calling party is notified that the mobile terminal is not in auto-answer mode and must accept before the PTT call session can occur.

7. In a PTT server, a computer readable medium storing a computer program product for activating a silent mode for PTT calls, the computer readable medium comprising:

computer program code for receiving a message from the client mobile terminal instructing the PTT server to disable the PoC global setting associated with the client mobile terminal's PTT server accept list, said message the result of the mobile terminal activating a silent mode, wherein in response to the PoC global setting being disabled, calls will be received at the client mobile terminal in a manual mode requiring an action at the mobile terminal for a PTT call session to occur, wherein a calling party is notified that the mobile terminal is not in auto-answer mode and must accept before the PTT call session can occur.

8. In a PTT server, a computer readable medium storing a computer program product for de-activating a silent mode for PTT calls, the computer readable medium comprising:

computer program code for receiving a message from the client mobile terminal instructing the PTT server to enable the PoC global setting associated with the client mobile terminal's PTT server accept list, said message the result of the mobile terminal de-activating a silent mode, wherein in response to the PoC global setting being enabled, calls will be received at the mobile terminal in an auto-answer mode for callers on the mobile terminal's PTT server accept list, wherein in the silent mode, calls are received at the mobile terminal in manual mode requiring an action at the mobile terminal for a PTT call session to occur and a calling party is notified that the mobile terminal is not in auto-answer mode and must accept before the PTT call session can occur.

\* \* \* \* \*